United States Patent [19]

Claar et al.

[11] Patent Number: 5,017,334

[45] Date of Patent: * May 21, 1991

[54] PROCESS FOR PREPARING SELF-SUPPORTING BODIES AND PRODUCTS PRODUCED THEREBY

[75] Inventors: Terry D. Claar, Newark, Del.; Steven M. Mason, Norwood, Pa.; Kevin P. Pochopien, Newark, Del.; Danny R. White, Elkton, Md.; William B. Johnson, Newark, Del.

[73] Assignee: Lanxide Technology Company, LP, Newark, Del.

[*] Notice: The portion of the term of this patent subsequent to Dec. 5, 2006 has been disclaimed.

[21] Appl. No.: 446,433

[22] Filed: Dec. 5, 1989

Related U.S. Application Data

[63] Continuation of Ser. No. 296,771, Jan. 18, 1989, Pat. No. 4,885,130, which is a continuation-in-part of Ser. No. 137,044, Dec. 23, 1987, which is a continuation-in-part of Ser. No. 73,533, Jul. 15, 1987.

[51] Int. Cl.$^5$ .............................................. B22F 3/26
[52] U.S. Cl. ......................................... 419/12; 75/238; 75/249; 419/14; 419/17; 419/27; 419/45
[58] Field of Search ................ 419/12, 14, 17, 27, 419/45; 75/244, 238

[56] References Cited

U.S. PATENT DOCUMENTS

| | | | |
|---|---|---|---|
| 3,758,662 | 9/1973 | Tobin | 264/332 |
| 3,864,154 | 2/1975 | Gazza et al. | 29/123 B |
| 4,471,059 | 9/1984 | Yoshino et al. | 501/96 |
| 4,492,670 | 1/1985 | Mizrah et al. | 419/12 |
| 4,544,524 | 10/1985 | Mizrah et al. | 419/12 |
| 4,585,618 | 4/1986 | Fresnel et al. | 419/12 |
| 4,595,595 | 1/1986 | Sane | 264/65 |
| 4,596,693 | 6/1986 | Ishizuka et al. | 419/17 X |
| 4,605,440 | 8/1986 | Halverson | 75/238 |
| 4,692,418 | 8/1987 | Boecker et al. | 501/90 |
| 4,702,770 | 10/1987 | Pyzik | 75/236 |
| 4,713,360 | 12/1987 | Newkirk et al. | 501/87 |
| 4,718,941 | 1/1988 | Halverson | 75/236 |
| 4,737,328 | 4/1988 | Morelock | 419/57 X |
| 4,777,014 | 10/1988 | Newkirk et al. | 419/12 |
| 4,885,130 | 12/1989 | Claar et al. | 419/12 |

FOREIGN PATENT DOCUMENTS

| | | |
|---|---|---|
| 0165707 | 5/1985 | European Pat. Off. . |
| 0193292 | 4/1986 | European Pat. Off. . |
| 0239520 | 5/1987 | European Pat. Off. . |
| 1492477 | 4/1976 | United Kingdom . |

Primary Examiner—Stephen J. Lechert, Jr.
Attorney, Agent, or Firm—Mark G. Mortenson; William E. McShane; Michael K. Boyer

[57] ABSTRACT

Self-supporting bodies are produced by reactive infiltration of a parent metal into a boron carbide material which may contain one or both of a boron donor material and a carbon donor material. The reactive infiltration typically results in a composite comprising a boron-containing compound, a carbon-containing compound and residual metal, if desired. The mass to be infiltrated may contain one or more inert fillers admixed with the boron carbide material, boron-containing compound and/or carbon-containing compound. The relative amounts of reactants and process conditions may be altered or controlled to yield a body containing varying volume percents of ceramic, metal, ratios of one ceramic to another and porosity.

9 Claims, 5 Drawing Sheets

PROCESS FOR PREPARING SELF-SUPPORTING BODIES AND PRODUCTS PRODUCED THEREBY

CROSS-REFERENCE TO RELATED APPLICATIONS

This application is a continuation of copending application Ser. No. 296,771, filed on Jan. 13, 1989, which issued to U.S. Pat. No. 4,885,130, on Dec. 5, 1989. Application Ser. No. 296,771, was a continuation-in-part of application Ser. No. 07/137,044, filed on Dec. 23, 1987, and now allowed, in the names of Terry Dennis Claar, Steven Michael Mason, Kevin Peter Pochopien and Danny Ray White, and entitled "Process for Preparing Self-Supporting Bodies and Products Made Thereby", which in turn is a continuation-in-part of application Ser. No. 073,533, filed on July 15, 1987, and now abandoned, in the names of Danny R. White, Michael K. Aghajanian and Terry D. Claar, and entitled "Process for Preparing Self-Supporting Bodies and Products Made Thereby".

FIELD OF THE INVENTION

This invention relates generally to a novel method of preparing self-supporting bodies, and to novel products made thereby. In its more specific aspects, this invention relates to a method of producing self-supporting bodies comprising one or more boron-containing compounds, e.g., a boride or a boride and a carbide, by reactive infiltration of a molten parent metal into a bed or mass containing boron carbide and at least one of a boron donor material (i.e., a boron-containing material) and a carbon donor material (i.e., a carbon-containing material) and, optionally, one or more inert fillers, to form the body.

BACKGROUND OF THE PRESENT INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot pressing, reaction sintering and reaction hot pressing is well known. In the case of hot pressing, fine powder particles of the desired boride are compacted at high temperatures and pressures. Reaction hot pressing involves, for example, compacting at elevated temperatures and pressures boron or a metal boride with a suitable metal-containing powder. U.S. Pat. No. 3,937,619 to Clougherty describes the preparation of a boride body by hot pressing a mixture of powdered metal with a powdered diboride, and U.S. Pat. No. 4,512,946 to Brun describes hot pressing ceramic powder with boron and a metal hydride to form a boride composite.

However, these hot pressing methods require special handling and expensive special equipment, they are limited as to the size and shape of the ceramic part produced, and they typically involve low process productivities and high manufacturing cost.

A second major limitation on the use of ceramics for structural applications is their general lack of toughness (i.e. damage tolerance or resistance to fracture). This characteristic tends to result in sudden, easily induced, catastrophic failure of ceramics in applications involving even rather moderate tensile stresses. This lack of toughness tends to be particularly common in monolithic ceramic boride bodies.

One approach to overcome this problem has been to attempt to use ceramics in combination with metals, for example, as cermets or metal matrix composites. The objective of this approach is to obtain a combination of the best properties of the ceramic (e.g. hardness and/or stiffness) and the metal (e.g. ductility). U.S. Pat. No. 4,585,618 to Fresnel, et al., discloses a method of producing a cermet whereby a bulk reaction mixture of particulate reactants, which react to produce a sintered self-sustaining ceramic body, is reacted while in contact with a molten metal. The molten metal infiltrates at least a portion of the resulting ceramic body. Exemplary of such a reaction mixture is one containing titanium, aluminum and boron oxide (all in particulate form), which is heated while in contact with a pool of molten aluminum. The reaction mixture reacts to form titanium diboride and alumina as the ceramic phase, which is infiltrated by the molten aluminum. Thus, this method uses the aluminum in the reaction mixture principally as a reducing agent. Further, the external pool of molten aluminum is not being used as a source of precursor metal for a boride forming reaction, but rather it is being utilized as a means to fill the pores in the resulting ceramic structure. This creates cermets which are wettable and resistant to molten aluminum. These cermets are particularly useful in aluminum production cells as components which contact the molten aluminum produced but preferably remain out of contact with the molten cryolite. There is further no employment of boron carbide in this process.

European Application 0,113,249 to Reeve, et al. discloses a method for making a cermet by first forming in situ dispersed particles of a ceramic phase in a molten metal phase, and then maintaining this molten condition for a time sufficient to effect formation of an intergrown ceramic network. Formation of the ceramic phase is illustrated by reacting a titanium salt with a boron salt in a molten metal such as aluminum. A ceramic boride is developed in situ and becomes an intergrown network. There is, however, no infiltration, and further the boride is formed as a precipitate in the molten metal. Both examples in the application expressly state that no grains were formed of $TiAl_3$, $AlB_2$, or $AlB_{12}$, but rather $TiB_2$ is formed demonstrating the fact that the aluminum is not the metal precursor to the boride. There is further no suggestion of using boron carbide as a precursor material in the process.

U.S. Pat. No. 3,864,154 to Gazza, et al. discloses a ceramic-metal system produced by infiltration. An $AlB_{12}$ compact was impregnated with molten aluminum under vacuum to yield a system of these components. Other materials prepared included $SiB_6$-Al, B-Al; $B_4C$-Al/Si; and $AlB_{12}$-B-Al. There is no suggestion whatsoever of a reaction, and no suggestion of making composites involving a reaction with the infiltrating metal nor of any reaction product embedding an inert filler or being part of a composite.

U.S. Pat. No. 4,605,440 to Halverson, et al., discloses that in order to obtain $B_4C$-Al composites, a $B_4C$-Al compact (formed by cold pressing a homogeneous mixture of $B_4C$ and Al powders) is subjected to sintering in either a vacuum or an argon atmosphere. There is no infiltration of molten metal from a pool or body of molten precursor metal into a preform. Further, there is no mention of a reaction product embedding an inert filler in order to obtain composites utilizing the favorable properties of the filler.

While these concepts for producing cermet materials have in some cases produced promising results, there is a general need for more effective and economical methods to prepare boride-containing materials.

DISCUSSION OF RELATED PATENT APPLICATIONS

Many of the above-discussed problems associated with the production of boride-containing materials have been addressed in co-pending U.S. patent application Ser. No. 073,533, now abandoned filed in the names of Danny R. White, Michael K. Aghajanian and T. Dennis Claar, on July 15, 1987, and entitled "Process for Preparing Self-Supporting Bodies and Products Made Thereby".

The following definitions were used in application '533 and shall apply to the instant application as well.

"Parent metal" refers to that metal (e.g. zirconium) which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal (e.g. zirconium) the metal identified should be read with this definition in mind unless indicated otherwise by the context.

"Parent metal boride" and "parent metal boro compounds" mean a reaction product containing boron formed upon reaction between boron carbide and the parent metal and includes a binary compound of boron with the parent metal as well as ternary or higher order compounds.

"Parent metal carbide" means a reaction product containing carbon formed upon reaction of boron carbide and parent metal.

Briefly summarizing the disclosure of application '533, self-supporting ceramic bodies are produced by utilizing a parent metal infiltration and reaction process (i.e., reactive infiltration) in the presence of a boron carbide. Particularly, a bed or mass of boron carbide is infiltrated by molten parent metal, and the bed may be comprised entirely of boron carbide, thus resulting in a self-supporting body comprising one or more parent metal boron-containing compounds, which compounds include a parent metal boride or a parent metal boro carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of application '533, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted boron carbide by a wicking or a capillary action. This transported metal forms additional parent metal, boride, carbide, and/or boro carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in application '533, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time. Preferably, conversion of the boron carbide to the parent metal boride, parent metal boro compound(s) and parent metal carbide is at least about 50%, and most preferably at least about 90%.

The typical environment or atmosphere which was utilized in application '533 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Copending U.S. patent application Ser. No. 137,044 (hereinafter referred to as "application '044"), now allowed, filed in the names of Terry Dennis Claar, Steven Michael Mason, Kevin Peter Pochopien and Danny Ray White, on Dec. 23, 1987, and entitled "Process for Preparing Self-Supporting Bodies and Products Made Thereby", is a Continuation-in-Part Application of application '533. Application '044 disclosed that in some cases it may be desirable to add a carbon donor material (i.e., a carbon-containing compound) to the bed or mass of boron carbide which is to be infiltrated by molten parent metal. Specifically, it was disclosed that the carbon donor material could be capable of reacting with the parent metal to form a parent metal-carbide phase which could modify resultant mechanical properties of the composite body, relative to a composite body which was produced without the use of a carbon donor material. Accordingly, it was disclosed that reactant concentrations and process conditions could be altered or controlled to yield a body containing varying volume percents of ceramic compounds, metal and/or porosity. For example, by adding a carbon donor material (e.g., graphite powder or carbon black) to the mass of boron carbide, the ratio of parent metal-boride/parent metal-carbide could be adjusted. In particular, if zirconium was used as the parent metal, the ratio of $ZrB_2/ZrC$ could be reduced (i.e., more ZrC could be produce due to the addition of a carbon donor material in the mass of boron carbide).

Application '044 also discloses the use of a graphite mold which contains an appropriate number of through-holes having a particular size, shape and location which function as a venting means to permit the removal of, for example, any gas which may be trapped in the preform or filler material as the parent metal reactive infiltration front infiltrates the preform.

In a related U.S. Patent, specifically, commonly owned U.S. Pat. No. 4,915,736, which issued on Apr. 10, 1990, from U.S. application Ser. No. 137,382 (hereinafter referred to as "application '382"), filed in the names of Terry Dennis Claar and Gerhard Hans Schiroky, on Dec. 23, 1987, and entitled "A Method of Modifying Ceramic Composite Bodies By a Carburization Process and Articles Made Thereby", additional modification techniques are disclosed. Specifically, application '382 discloses that a ceramic composite body made in accordance with the teachings of application '533 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, application '382 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5-30 volume percent, such composite body could be modified by a post-carburization treatment to result in from about 0 to about 2 volume percent, typically about ½ to about 2 volume percent, of parent metal remaining in the composite body.

The disclosures of each of the above-discussed Commonly Owned U.S. patent applications and U.S. Patents are herein expressly incorporated by reference.

SUMMARY OF THE INVENTION

In accordance with the present invention, self-supporting ceramic bodies are produced utilizing a parent metal infiltration and reaction process (i.e. reactive infiltration) in the presence of boron carbide. A bed or mass of boron carbide is infiltrated by molten parent metal, and the bed may be comprised entirely of boron carbide, resulting in a self-supporting body comprising one or more parent metal boron-containing compounds, which compounds include a parent metal boride or a parent metal boro carbide, or both, and typically also may include a parent metal carbide. Alternatively, the mass to be infiltrated may contain one or more inert fillers admixed with the boron carbide to produce a composite by reactive infiltration, which composite comprises a matrix of one or more boron-containing compounds and also may include a parent metal carbide. In both embodiments, the final product may include a metal as one or more metallic constituents of the parent metal. Still further, in some cases it may be desirable to add a carbon donor material (i.e., a carbon-containing compound) and/or a boron donor material (i.e., a boron-containing compound) to the boron carbide, the carbon donor material and/or the boron donor material being capable of reacting with the parent metal, and in the case of the carbon donor material, forming a parent metal-carbide phase, and in the case of the boron donor material, forming a parent metal-boride phase, thereby modifying resultant mechanical properties of the composite body.

The reactant concentrations and process conditions may be altered or controlled to yield a body containing varying volume percents of ceramic compounds, metal and/or porosity. Specifically, when a carbon donor material is used, the amount of parent metal carbide relative to parent metal boride may be increased (i.e., the ratio of parent metal carbide to parent metal boride increases). Moreover, in some cases it may be desirable to add a boron donor material (i.e., a boron-containing compound), such excess boron donor material being capable of reacting with the parent metal to form a parent metal-boride phase, thereby modifying resultant mechanical properties of the composite body. Specifically, the amount of parent metal boride relative to parent metal carbide may be increased (i.e., the ratio of parent metal boride to parent metal carbide increases).

Moreover, in addition to the discussion of parent metals set forth above herein, it has been discovered that in some circumstances it may be desirable to utilize specific parent metal alloys to achieve a particular desirable result. For example, it has been discovered that a titanium/zirconium alloy produces very desirable self-supporting ceramic bodies by the above-described reactive infiltration process. Specifically, similar to that which was discussed above herein, a bed or mass comprising boron carbide is infiltrated by a molten titanium/zirconium alloy. The particular advantages that are achieved by utilizing a titanium/zirconium alloy are that the resulting self-supporting body may have even better high temperature mechanical properties relative to a self-supporting body made with a parent metal comprising primarily zirconium. Accordingly, while either of the parent metals of titanium/zirconium may be used alone, certain advantages may be achieved when titanium is alloyed into zirconium or zirconium is alloyed into titanium in a range of from about substantially pure titanium to about substantially pure zirconium. When such a titanium/zirconium alloy reactively infiltrates a bed or mass comprising boron carbide, the reaction products which are produced include titanium borides (e.g., $TiB_2$), zirconium borides (e.g., $ZrB_2$), titanium boro carbides and zirconium boro carbides, or a combination of the compounds, and typically may also contain titanium carbide and zirconium carbide. Still further, as discussed above, the mass to be infiltrated may contain one or more inert fillers admixed with the boron carbide and/or a carbon donor material (i.e., a carbon-containing compound) and/or a boron donor material (i.e., a boron-containing compound). In all of these embodiments, the final product may also include one or more metals, as one or more metallic constituents, of the titanium/zirconium alloy.

Broadly, in the method of this invention, a mass comprising boron carbide is placed adjacent to or contacted with a body of molten metal or metal alloy, which is melted in a substantially inert environment within a particular temperature envelope. The molten metal infiltrates the mass and reacts with the boron carbide to form one or more reaction products. The boron carbide is reducible, at least in part, by the molten parent metal to form the parent metal boron-containing compound, e.g. a parent metal boride and/or boro compound, under the temperature conditions of the process. Typically a parent metal carbide is also produced, and in certain cases a parent metal boro carbide is produced. At least a portion of the reaction product is maintained in contact with the metal, and molten metal is drawn or transported toward the unreacted boron carbide by a wicking or capillary action. This transported metal forms additional parent metal boride, carbide, and/or boro carbide, and the formation or development of a ceramic body is continued until the parent metal or boron carbide has been consumed, or until the reaction temperature is altered to be outside the reaction temperature envelope. The resulting structure comprises one or more of a parent metal boride, a parent metal boro compound, a parent metal carbide, a metal (which as used herein is intended to include alloys and intermetallics), or voids, or a combination thereof, and these several phases may or may not be interconnected in one or more dimensions. The final volume fractions of the boron- containing compounds (i.e. boride and boro compounds), carbon-containing compounds, and metallic phases, and the degree of interconnectivity, can be controlled by changing one or more conditions, such as the initial density of the boron carbide body, the relative amounts of boron carbide and parent metal, alloying the parent metal, dilution of the boron carbide with a filler, temperature and time.

Moreover, by adding a carbon donor material (e.g., graphite powder or carbon black) and/or a boron donor material (e.g., a boron powder, silicon borides, nickel borides and iron borides) to the mass of boron carbide, the ratio of parent metal-boride/parent metal-carbide can be adjusted. For example, if zirconium is used as the parent metal, the ratio of $ZrB_2/ZrC$ can be reduced if a carbon donor material is utilized (i.e., more ZrC is produced due to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be large than platelets that are formed by a similar process without the use of a boron donor material. Thus, the addition a carbon donor material and/or a boron donor material may also effect the morphology of the resultant material.

Typically, the mass of boron carbide will be at least somewhat porous so as to allow for wicking the parent metal through the reaction product. Wicking occurs apparently either because any volume change on reaction does not fully close off pores through which parent metal can continue to wick, or because the reaction product remains permeable to the molten metal due to such factors as surface energy considerations which render at least some of its grain boundaries permeable to the parent metal.

In another embodiment, a composite is produced by the transport of molten parent metal into a bedding of boron carbide admixed with one or more inert filler materials. In this embodiment, boron carbide is incorporated into a suitable filler material, which then is placed adjacent to or in contact with the molten parent metal. This setup may be supported on or in a separate bed that is substantially non-wettable by and non-reactive with the molten metal under the process conditions. The molten parent metal infiltrates the boron carbide-filler mixture and reacts with the boron carbide to form one or more boron-containing compounds. The resulting self-supporting ceramic-metal composite typically is a dense microstructure which comprises a filler embedded by a matrix comprising boron-containing compound(s), and also may include a carbide and metal. Only a small amount of boron carbide is required to promote the reactive infiltration process. Thus, the resulting matrix can vary in content from one composed primarily of metallic constituents thereby exhibiting certain properties characteristic of the parent metal; to cases where a high concentration of the boron carbide is used in the process, thereby producing a significant boron-containing compound(s) phase which, together with any carbon-containing compounds, dominate the properties of the matrix. The filler may serve to enhance the properties of the composite, lower the raw material cost of the composite, or moderate the kinetics of the boron-containing compound(s) and/or carbon-containing compound formation reactions and the associated rate of heat evolution.

In a further embodiment, the material to be infiltrated is shaped into a preform corresponding to the geometry of the desire final composite. Subsequent reactive infiltration of the preform by the molten parent metal results in a composite having the net shape or near net shape of the preform, thereby minimizing expensive final machining and finishing operations. Moreover, to assist in reducing the amount of final machining and finishing operations, a barrier material can surround the preform. The use of a graphite mold is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the present invention, is reduced. Typically, a plurality of holes can be placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

Definitions

As used in this specification and the appended claims, the terms below ar defined as follows:

"Parent metal" refers to that metal, e.g. zirconium, which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal, e.g. zirconium, the metal identified should be read with this definition in mind unless indicated otherwise, by the context.

"Parent metal boride" and "parent metal boro compounds" mean a reaction product containing boron formed upon reaction between boron carbide and the parent metal and includes a binary compound of boron with the parent metal as well as ternary or higher order compounds. "Parent metal carbide" means a reaction product containing carbon formed upon reaction of carbide and parent metal.

DETAILED DESCRIPTION OF THE INVENTION AND PREFERRED EMBODIMENTS

Figure 1:
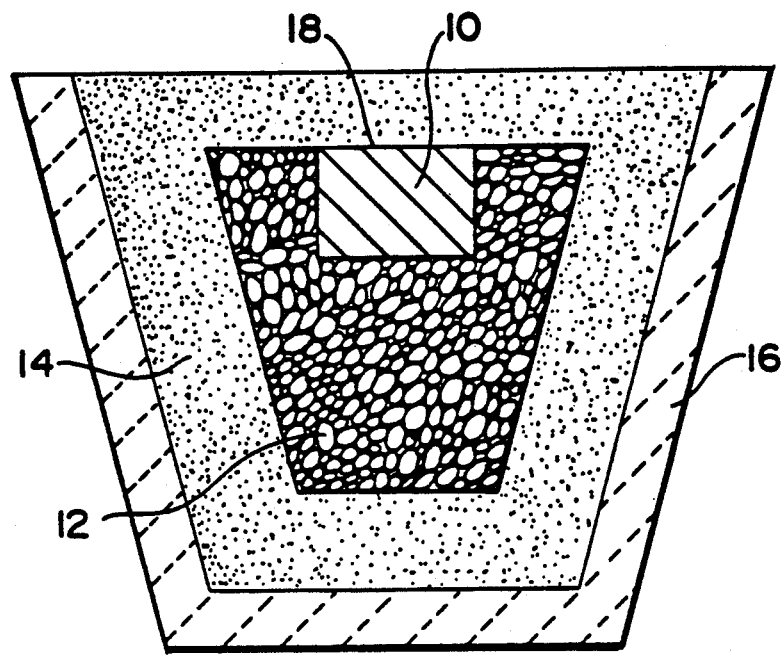
FIG. 1 is a schematic elevational view in cross-section showing a parent metal ingot embedded in a particulate of boron carbide within a refractory crucible, to be processed in accordance with the invention.

In accordance with the invention, a self-supporting body is produced by the reactive infiltration of a molten parent metal with boron carbide to form a polycrystalline ceramic-containing body comprising the reaction product(s) of the parent metal with boron carbide, and also may include one or more constituents of the parent metal. The boron carbide, typically a solid at the process conditions, is preferably in fine particulate or powdered form. The environment or atmosphere for the process is chosen to be relatively inert or nonreactive under the process conditions. Argon or vacuum, for example, would be suitable process atmospheres. The resulting product comprises one or more of (a) a parent metal boride, (b) a boro compound, (c) usually a parent metal carbide, and (d) metal. The constituents and proportions in the product depend largely on the choice and composition of parent metal and the reaction conditions. Also, the self-supporting body produced may exhibit porosity or voids.

In the preferred embodiments of the present invention, the parent metal and a mass or bedding comprising boron carbide are positioned adjacent to each other so that reactive infiltration will be in the direction towards and into the bedding. The bedding, which may be pre-shaped, may include a filler material, such as a reinforcing filler, which is substantially inert under the process conditions. The reaction product can grow into the bedding without substantially disturbing or displacing it. Thus, no external forces are required which might damage or disturb the arrangement of the bedding and no awkward or costly high temperature, high pressure processes and facilities are required to create the reaction product. Reactive infiltration of the parent metal into and with the boron carbide, which preferably is in particulate or powdered form, forms a composite typically comprising a parent metal boride and a parent metal boro compound. With aluminum as the parent metal, the product may comprise an aluminum boro carbide (e.g. $Al_3B_{48}C_2$, $AlB_{12}C_2$, $AlB_{24}C_4$), and also may include metal, e.g. aluminum, and possible other unreacted or unoxidized constituents of the parent metal. If zirconium is the parent metal, the resulting composite comprises zirconium boride and zirconium carbide. Also, zirconium metal may be present in the composite. Alteratively, if a titanium/zirconium alloy is used as the parent metal, the resulting composite comprises titanium boride, titanium carbide, zirconium boride and zirconium carbide. Additionally, some titanium/zirconium alloy may be present in the composite as residual or nonreacted parent metal.

Although the present invention is hereinafter described with particular reference to certain preferred embodiments in which the parent metal comprises zirconium or aluminum, this is for illustrative purposes only. Other parent metals also may be used such as silicon, titanium, hafnium, lanthanum, iron, calcium, vanadium, niobium, magnesium, chromium, beryllium and titanium/zirconium alloys, and examples for several such parent metals are given below.

Referring to FIG. 1, the parent metal 10 as the precursor, e.g. zirconium, is formed into an ingot, billet, rod, plate, or the like. The metal is at least partially embedding in particulate boron carbide 12, preferably having a particle size of from about 0.1 $\mu$m to 100 $\mu$m. This setup or assembly is surrounded by an inert material 14, typically in particulate form, which is not-wettable by and non-reactive with the molten metal under the process conditions, and contained within a crucible 16 or other refractory vessel. The top surface 18 of the parent metal may be exposed, or the parent metal may be completely embedded or surrounded by the boron carbide, and also the inert bed 14 may be omitted. This assembly is placed in a furnace and heated, preferably in an inert atmosphere such as argon, above the melting point of the parent metal but preferably below the melting point of the desired reaction product so as to form a body or pool of molten metal. It should be understood that the operable temperature range or preferred temperature may not extend over this entire interval. The temperature range will depend largely upon such factors as the composition of the parent metal and the desired phases in the resulting composite. Molten metal contacts the boron carbide, and a parent metal boride (e.g. zirconium diboride) and a parent metal carbide (e.g., zirconium carbide) are formed as the reaction product. Upon continued exposure to the boron carbide, the remaining molten metal is progressively drawn through the reaction product in the direction of and into the mass containing the boron carbide, to provide continued formation of reaction product at the interface between the molten metal and boron carbide. The product produced by this method comprises the reaction product(s) of the parent metal with the boron carbide, or may comprise a ceramic-metal composite to include further one or more unreacted or non-oxidized constituents of the parent metal. A substantial amount of the boron carbide is reacted to form the reaction product(s), preferably this amount being at least about 50% and most preferably at least about 90%. The ceramic crystallites formed as the reaction product by the process may or may not be interconnected, but preferably are interconnected in three dimensions, and the metallic phases and any voids in the product are normally at least partially interconnected. Any porosity tends to result from a partial or nearly complete depletion of the parent metallic phase in favor of the formation of additional reaction product (as in the case where stoichiometric reactants or excess boron carbide is present), but the volume percent of voids will depend on such factors as temperature, time, type of parent metal, and the porosity of the mass of boron carbide.

Figure 3:
FIG. 3 is a photomicrograph at 1000X magnification of a section of a ceramic composite formed by the method described in Example 1.
Figure 4:
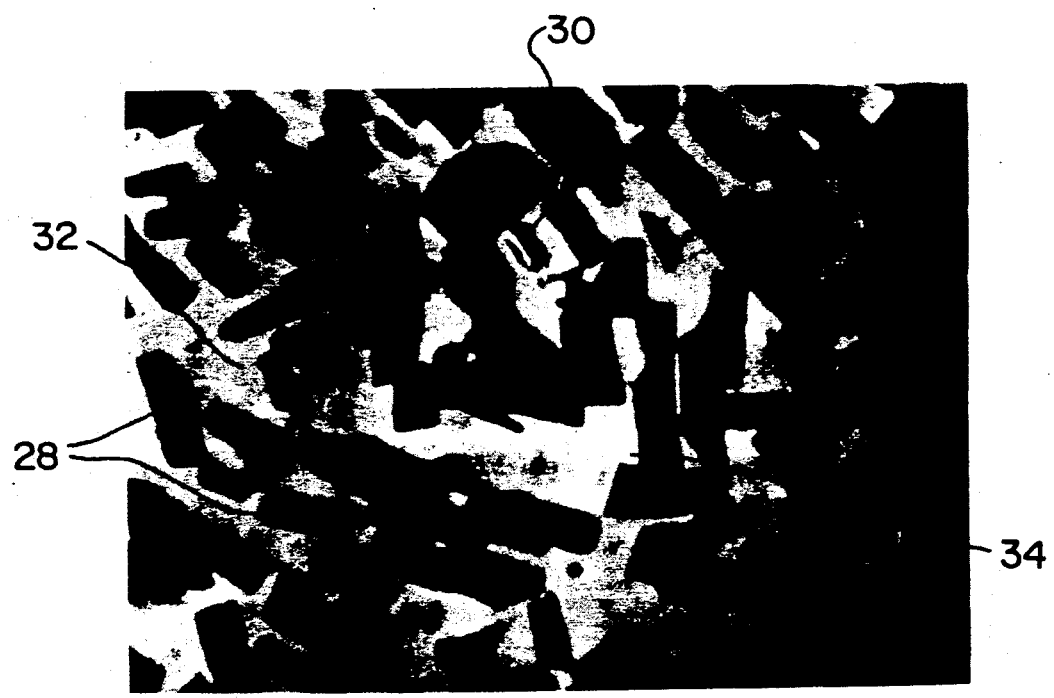
FIG. 4 is a photomicrograph at 1500X magnification of a section of a ceramic composite formed by the method described in Example 6.
Figure 5:
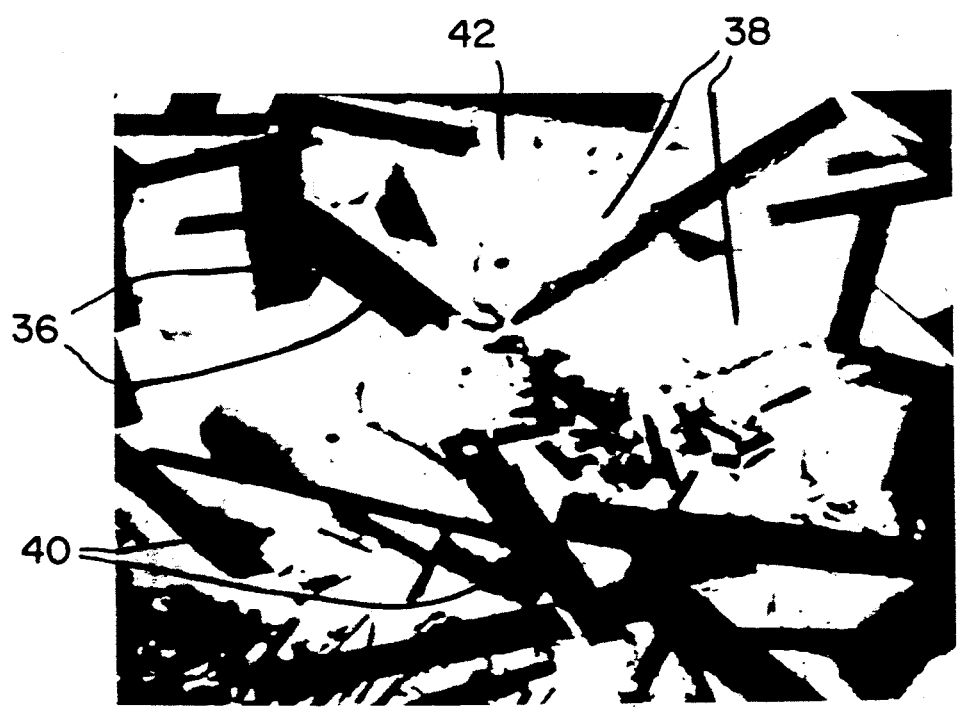
FIG. 5 is a photomicrograph at 1500X magnification of a section of a ceramic composite formed by the method of Example 8.

It has been observed that products made in accordance with this invention using zirconium, titanium and hafnium as the parent metal form a parent metal boride characterized by a platelet-like structure. These platelets typically are unaligned or randomly oriented, as can be seen in FIGS. 3, 4 and 5. This platelet-like structure and the metallic phase appear to account at least in large part for the extraordinarily high fracture toughness of this composite, about 12 mega Pascals meters$^{\frac{1}{2}}$ or higher, because of crack deflection and/or pull-out mechanisms.

In another aspect of the invention, there is provided a self-supporting body, including composite bodies, comprising a matrix of reaction product, and, optionally metallic constituents, embedding a substantially inert filler. The matrix is formed by the reactive infiltration of a parent metal into a bed or mass of the filler intimately mixed with boron carbide. The filler material may be of any size or shape, and may be oriented with respect to the parent metal in any manner as long as the direction of development of the reaction product will be towards and will engulf at least a portion of the filler material without substantially disturbing or displacing it. The filler may be composed of or comprise any suitable material, such as ceramic and/or metal fibers, whiskers, particulates, powders, rods, wires, wire cloth, refractory cloth, plates, platelets, reticulated foam structure, solid or hollow spheres, etc. A particularly useful filler is alumina, but other oxides and ceramic fillers may be used depending on the starting materials and the end properties desired. The volume of filler material may be a loose or bonded array or arrangement, which array has interstices, openings, intervening spaces, or the like, to render the filler material permeable to the infiltration of molten parent metal. Further the filler material may be homogeneous or heterogeneous. If desired, these material may be bonded with any suitable binding agent (e.g. Avicil PH 105, from FMC Co.) which does not interfere with the reactions of this invention or leave any undesirable residual by-products within the final composite product. A filler which would tend to react excessively with the boron carbide or with the molten metal during processing may be coated so as to render the filler inert to the process environment. For example, carbon fiber, if used as a filler in conjunction with aluminum as the parent metal will tend to react with molten aluminum, but this reaction can be avoided if the fiber is first coated, e.g. with alumina.

Figure 6:
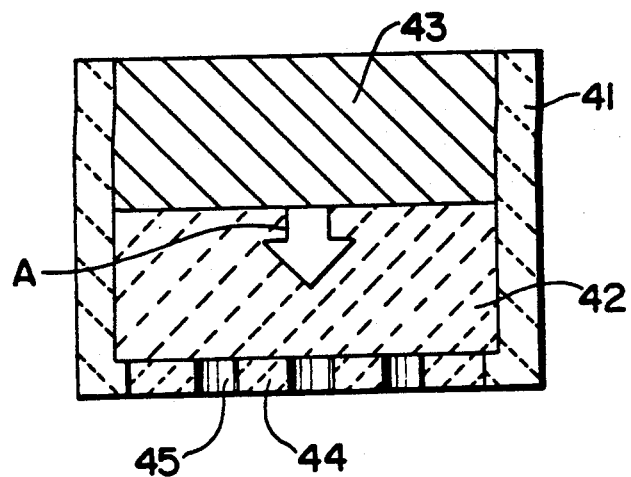
FIG. 6 is a schematic elevational view in cross-section showing a preform in contact with a parent metal, both of which are contained in a refractory vessel.
Figure 7:
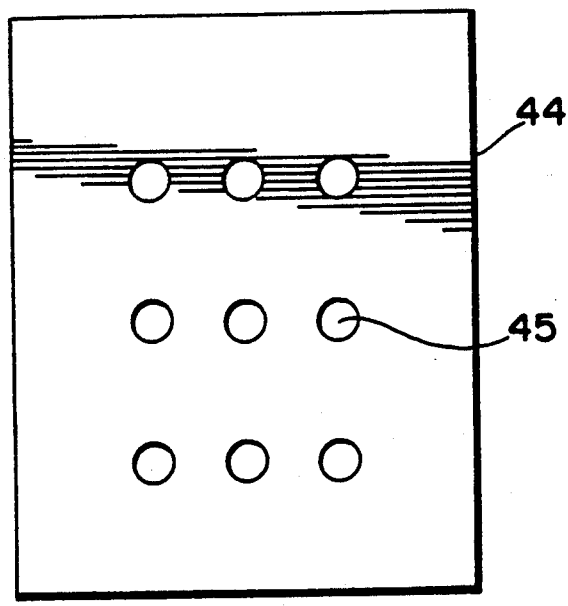
FIG. 7 shows a bottom view of the refractory vessel shown in FIG. 6.

A suitable refractory container holding the parent metal and a bed or volume of filler with admixed boron carbide properly oriented to permit reactive infiltration of the parent metal into the filler bed and proper development of the composite, is placed in a furnace, and this lay-up is heated to a temperature above the melting point of the parent metal. At these elevated temperatures, the molten parent metal infiltrates the permeable filler by a wicking process and reacts with the boron carbide, thereby producing the desired ceramic or ceramic-metal composite body. Moreover, to assist in reducing the amount of final machining and finishing operations, a barrier material can surround the preform. The use of a graphite mold is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the present invention, is reduced. Typically, a plurality of holes is placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform. FIG. 6 and FIG. 7 show a preform 42 in contact with a parent metal ingot 43, both of which are contained in a graphite refractory vessel 41. The graphite refractory vessel 41 has a bottom portion 44 having therein a plurality of through-holes 45 which function as a venting means. The through-holes 45 permit any gas trapped in the preform (e.g., argon) to escape as the parent metal reactive infiltration front infiltrates the preform (i.e., the reactive infiltration front penetrates the preform in the direction of the arrow "A" in FIG. 6). Thus, porosity in the formed composite body can be reduced.

Figure 2:
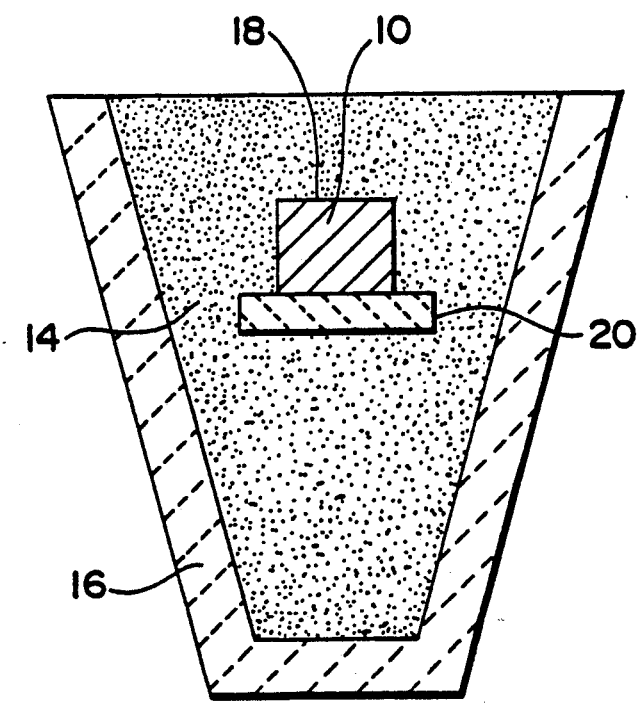
FIG. 2 is a schematic elevational view in cross-section showing a parent metal ingot positioned adjacent a preform of boron carbide and embedded in an inert bed contained within a refractory crucible, to be processed in accordance with the invention.

A composite made by practicing this invention is illustrated in FIG. 2. The boron carbide, together with any desired inert filler materials, is fabricated into a preform with a shape corresponding to the desired geometry of the final composite. The preform 20 is superimposed with the parent metal precursor 10 and the assembly is surrounded by the inert material 14 contained within the crucible 16. The top surface 18 of the parent metal may or may not be exposed. The preform 20 may be prepared by any of a wide range of conventional ceramic body formation methods (such as uniaxial pressing, isostatic pressing, slip casting, sedimentation casting, tape casting, injection molding, filament winding for fibrous materials, etc.) depending on the characteristics of the filler. Initial bonding of the filler particles, whiskers, fibers, or the like, prior to reactive infiltration may be obtained through light sintering or by use of various organic or inorganic binder materials which do not interfere with the process or contribute undesirable by-products to the finished material. The preform 20 is manufactured to have sufficient shape integrity and green strength, and should be permeable to the transport of molten metal, preferably having a porosity of between about 5 and 90% by volume and more preferably between about 25 and 75% by volume. In the case of an aluminum parent metal, suitable filler materials include, for example, silicon carbide, titanium diboride, alumina and aluminum dodecaboride (among others), and as particulates typically having a mesh size of from about 14 to 1000, but any admixture of filler materials and mesh sizes may be used. The preform 20 is then contacted with molten parent metal on one or more of its surfaces for a time sufficient to complete infiltration of the matrix to the surface boundaries of the preform. The result of this preform method is a ceramic-metal composite body of a shape closely or exactly representing that desired in the final product, thus minimizing or eliminating expensive final machining or grinding operations.

It has been discovered that infiltration of the permeable filler by the parent metal is promoted by the presence of a boron carbide in the filler. A small amount of boron source has been shown to be effective, but the minimum can depend upon a number of factors such as type and particle size of the boron carbide, type of parent metal, type of filler, and process conditions. Thus, a wide variation of boron carbide concentrations can be provided in the filler, but the lower the concentration of boron carbide, the higher the volume percent of metal in the matrix. When very low amounts of the boron carbide are used, e.g. one to three weight percent based on the total weight of boron carbide plus filler, the resulting matrix is interconnected metal and a limited amount of parent metal boride and parent metal carbide dispersed in the metal. In the absence of boron carbide, reactive infiltration of the filler may not occur, and infiltration may be not be possible without special procedures, such as the application of external pressure to force the metal into the filler.

Because a wide range of boron carbide concentrations in the filler can be used in the process of this invention, it is possible to control or to modify the properties of the completed product by varying the concentration of boron carbide and/or the composition of the bed. When only a small amount of boron carbide is present relative to the amount of parent metal, such that the mass comprises a low density of boron carbide, the composite body or matrix properties are dominated by the properties of the parent metal, most typically ductility and toughness, because the matrix is predominantly metal. Such a product may be advantageous for low or mid-range temperature applications. When a large amount of boron carbide is used, as for example when compound(s) having boron carbide particles are densely packed around a filler material or occupy a high percentage of space between constituents of the filler, the resulting body or matrix properties tend to be dominated by the parent metal boride and any parent metal carbide, in that the body or matrix would be harder or less ductile or less tough. If the stoichiometry is closely controlled so as to achieve substantially complete conversion of the parent metal, the resulting product will contain little or no metal, which may be advantageous for high temperature applications of the product. Also, the substantially complete conversion of the parent metal could be significant especially in some high temperature applications, because the boride reaction product is more stable than boron carbide in that boron carbide will tend to react with residual or unoxidized metal, e.g. aluminum, present in the product.

Where desired, a carbon donor material (e.g., elemental carbon) may be admixed with the boron carbide bed or preform containing boron carbide and, optionally, a filler. This excess carbon, typically varying from about 5 to 10 weight percent of the total bedding, reacts with the parent metal thereby assuring substantially complete reaction of the metal. This reaction of the metal with the carbon will depend largely on the relative amount of carbon used, the type, e.g. carbon black or graphite, and crystallinity. Selection among these extreme characteristics may be highly desirable to meet the needs of different potential applications for these products. For example, by adding about 5-75, preferably about 5-50, percent by weight of carbon black to a $B_4C$ preform and reactively infiltrating the preform with a zirconium metal, the ratio of $ZrB_2/ZrC$ can be lowered (i.e., more ZrC is formed).

Also, a boron donor material (e.g., elemental or powdered boron) may be admixed with the boron carbide bed or preform. Particularly, it has been discovered that reactive infiltration may be facilitated when aluminum is used as the parent metal. Such an admixture reduces the cost of the bed relative to an all boron carbide bed, result in the formation of a product containing a boro carbide such as aluminum boro carbide which possesses certain properties comparable to aluminum boride, and prevents the formation of aluminum carbide which is unstable in the presence of moisture and therefore degrades the structural properties of the product. However, the presence of a boron donor material also serves to modify the ratio of parent metal boride/parent metal carbide. For example, when zirconium is used as the parent metal, the ratio of $ZrB_2/ZrC$ could be increased (i.e., more $ZrB_2$ is formed).

Additional variations in the characteristics and properties of the composite can be created by controlling the infiltration conditions. Variables which can be manipulated include the nature and size of the particles of boron carbide material, and the temperature and time of infiltration. For example, reactive infiltration involving large boron carbide particles and minimum exposure times at low temperatures will result in a partial conversion of the boron carbide to parent metal boron and parent metal carbon compound(s). As a consequence, unreacted boron carbide material remains in the microstructure, which may impart desirable properties to the finished material for some purposes. Infiltration involving the boron carbide particles, high temperatures and prolonged exposure times (perhaps even to hold at temperature after infiltration is complete) will tend to favor substantially complete conversion of the parent metal to the parent metal boride and carbon compound(s). Preferably, conversion of the boron carbide to the parent metal boride, parent metal boro compound(s) and parent metal carbide is at least about 50%, and most preferably at least about 90%. Infiltration at high temperatures (or a subsequent high temperature treatment) also may result in densification of some of the composite constituents by a sintering process. In addition, as noted previously, the reduction of the amount of available parent metal below that necessary to form the boron and carbon compound(s) and fill the resulting interstices in the material may result in a porous body which also could have useful applications. In such a composite, porosity may vary from about 1 and 25 volume percent, and sometimes higher, depending upon the several factors or conditions enumerated above.

The following Examples illustrate the novel reaction products of this invention and the method by which they are prepared; however, these Examples are illustrative only and they are not intended to limit the invention claimed. The test procedures for measuring certain properties of specimens prepared in these examples were as follows:

The room temperature four-point flexure tests were conducted in a Model 123 Instron test machine using procedures outlines in U.S. Army MIL-STD-142 (MR). The specimens were bars measuring 3×4×50 mm. Their tensile surfaces were surface ground using a 500 grit diamond wheel, and their corners chamfered to eliminate chips and other defects. The steel flexure fixture had a 20 mm inner span and a 40 mm outer span. Flexural strengths were calculated from the peak breaking loads and the specimen and fixture dimensions using elastic beam equations.

The fracture toughness was determined by testing flexural bars measuring 5×4×50 mm. A chevron notch with an included angle of 60° was machined at the mid lengths of the specimens with a 0.3 mm wide diamond blade. Then, four-point chevron notch flexure tests were conducted by the same methods described for the flexural strengths.

The density was determined by weighing and measuring rectangular blocks.

The elastic modulus was determined by the sonic resonance technique, using the procedure described in ASTM C623-71. The samples measured approximately 5×4×45 mm, and were all machined with a series of diamond cutting and grinding operations. Three modes of vibration were separately stimulated in each bar, namely, the torsional mode, the flexural mode perpendicular to the 5 mm width, and the flexural mode perpendicular to the 4 mm width. In each case, the fundamental harmonic resonant frequency was determined. The flexural resonances provided measurements of Young's modulus (E), and the torsional resonance provided measurements of the shear modulus (G).

The hardness was determined by using the A scale on a Rockwell hardness tester and following the procedure described in ASTM E18-84. The goal of the tests was to obtain a hardness value representative of the composite as a whole rather than of single phase regions.

EXAMPLE 1

A 2-inch square by ⅛-inch thick preform was prepared by admixing 95% by weight $B_4C$ (1000 grit) and 5% by weight of an organic binder (Acrawax-C from Lonza, Inc.) then cold pressing the composition in a steel die with the specified geometry at 5,000 psi. A 2-inch square by ⅛-inch thick plate of zirconium was placed on top of, and in contact with, the $B_4C$ particulate preform and the entire setup was placed in a graphite mold.

The assembly, consisting of the graphite mold and its contents, was placed in a resistance-heated vacuum furnace supplied with argon gas flowing at 2 liters/minute. The assembly was heated from room temperature to 450° C. over a period of 2.5 hours to burn out the organic binder. It was then heated to a 1950° C. setpoint temperature over a five- hour period and maintained at 1950° C. for 2 hours. The assembly was allowed to cool for five hours prior to removal from the furnace.

After the assembly was removed from the furnace, the unreacted zirconium was mechanically removed from the surface of the setup by grinding, and a powdered sample of the underlying ceramic composite was recovered and subjected to x-ray diffraction analysis. This analysis showed the presence of $ZrB_2$, $ZrC$, and $Zr$. Further tests revealed that the ceramic composite had the following properties: an average density (g/cc) of about 6.2; an elastic modulus (GPa) of 380; a flexural strength (MPa) of 875; and a critical stress intensity factor (fracture toughness) of 15 (MPa-m$^{\frac{1}{2}}$).

FIG. 3 is a photomicrograph at 100X magnification of a cross-section of the composite product showing $ZrB_2$ as 22, $ZrC$ as 24, and $Zr$ as 26. The $ZrB_2$ phase in this composite appeared in the form of platelets, which are unaligned or randomly oriented.

EXAMPLE 2

A zirconium metal ingot measuring ½ inch in diameter and ¾ inch tall was embedded in particulate boron carbide (Atlantic Equipment Engineers, Bergenfield, N.J., $B_4C$ 99.7%, 1–5 micron) contained within a alumina crucible. The assembly, consisting of the alumina crucible and its contents, was placed in an induction furnace supplied with argon gas flowing at 300 cc/minute. The assembly was heated to 1800° C. (as measured by an optical pyrometer) over a period of 5 minutes and then maintained at 1800° C. for 4 minutes before it was allowed to cool.

After the assembly was removed from the furnace, a powdered sample of the resulting ceramic composite was received and subjected to x-ray diffraction analysis. This analysis showed the presence of $ZrB_2$, $ZrC$ and $Zr$. The $ZrB_2$ phase in this composite appeared in the form of platelets.

EXAMPLE 3

A preform measuring 2 ¼-inch square and ⅛-inch thick was prepared by admixing 93% by weight boron carbide ($B_4C$) particles of 320 mesh size and 7% by weight or organic binder (Avicil PH 105 from FMC Co.) and then cold pressing the admixture in a steel die with the specified geometry at 10,000 psi. A 2- inch square and ⅛-inch thick aluminum alloy, designated 1100, was placed on top of, and in contact with, the $B_4C$ preform and the entire setup was embedded in alumina particles (E38 Alundum from Norton Co., 90 grit) contained in a refractory vessel, as illustrated in FIG. 2.

The assembly, consisting of the refractory vessel and its contents, was heated to a 1200° C. setpoint temperature, over a ten-hour period, in a resistance heated vacuum furnace supplied with argon gas flowing at 1 liter/min. After the 1200° C. temperature was maintained for 24 hours, the assembly was allowed to cool for six hours prior to removal from the furnace.

After the assembly was removed from the furnace, the unreacted aluminum on the surface of the setup was removed mechanically and a small amount of the underlying ceramic composite was reduced to powder. This powder was subjected to x-ray diffraction analysis which showed the presence of Al, $B_4C$, $Al_2O_3$ and $Al_8B_4C_7$. Further tests showed that the resulting ceramic composite had the following properties: a density (g/cc) of 2.58; an elastic modulus (gPa) of 189; a hardness (Rockwell A) of 46; a flexural strength (MPa) of $254\pm3$; and a fracture toughness (MPa-m$^{\frac{1}{2}}$) of $10.2\pm0.1$.

EXAMPLE 4

A preform measuring 2¼-inch square and ½-inch thick was prepared from a uniform mixture comprised of 94% by weight $B_4C/B$ (in an admixture of 50% by weight, 320 mesh $B_4C$; and 50% by weight, −38 micron B), and 6% by weight of organic binder (Avicil PH 105 from FMC Co.) The preform was prepared by cold pressing the mixture in a steel die with the specified geometry at 10,000 psi. A two-inch square and ⅛-inch thick aluminum alloy, designated 1100, was placed on top of, and in contact with, the $B_4C/B$ particulate preform and the entire setup was embedded in alumina particles (38 Alundum from Norton, Co., 24 grit) contained in a refractory vessel, as illustrated in FIG. 2.

The assembly, consisting of the refractory vessel and its contents, was placed in a resistance-heated tube furnace supplied with argon gas flowing at 300 cc/min, heated to a 1200° C. setpoint temperature over a ten-hour period, and maintained at 1200° C. for 36 hours. The assembly was allowed to cool for ten hours prior to removal from the furnace.

After the assembly was removed from the furnace, the unreacted aluminum on the surface of the setup was mechanically removed and a powdered sample of the underlying ceramic composite was subjected to x-ray diffraction analysis. This analysis showed that the ceramic composite contained Al, $\beta$-$AlB_{12}$, $Al_3B_{48}C_2$, and an unidentified phase, with a "d" spacing (lattice spacing) of 2.926, 2.679, 2.087, 1.84 and 1.745 m with relative intensities of 100, 36, 40, 20 and 73, respectively, Further tests determined that the composite had the following properties: a density (g/cc) of 2.58; an elastic modulus (GPa) of 215; a flexural strength (MPa) of $196\pm9$; and a fracture toughness (MPa-m$^{\frac{1}{2}}$) of $8.1\pm0.3$.

EXAMPLE 5

A preform measuring 2¼-inch square and ½-inch thick was prepared by the technique described in Example I except that the uniform mixture here was comprised by 94% by weight $B_4C/B$ (in an admixture of 50% by weight, 320 mesh $B_4C$; and 50% by weight, 38 micron and finer B), and 6% by weight of the same binder. A two-inch square and ⅛-inch thick plate of aluminum alloy Al-10 Si-3 Mg (10% by weight Si, 3% by weight Mg, and the balance Al) was placed on top of, and in contact with, the $B_4C/B$ particulate preform and the entire setup was embedded in alumina particles (38 Alundum from Norton, Co., 24 grit) contained in a refractory vessel, as illustrated in FIG. 2.

The assembly, consisting of the refractory vessel and its contents, was placed in a resistance-heated vacuum furnace supplied with argon gas flowing at 1 liter/min, heated to a 1200° C. setpoint temperature over a ten-hour period, and maintained at 1200° C. for 12 hours. The assembly was allowed to cool for five hours prior to removal from the furnace.

After the assembly was removed from the furnace, the unreacted aluminum on the surface of the setup was mechanically removed, and a powdered sample of the underlying ceramic composite was recovered and subjected to x-ray diffraction analysis. This analysis showed that the ceramic composite contained Al, Si, $B_4C$, $\beta$-$AlB_{12}$, $Al_2O_3$, and $Al_8B_4C_7$. Further tests showed that the composite had the following properties: a density (g/cc) of 2.55; an elastic modulus (GPa) of 213; a hardness (Rockwell A) of 57; a flexural strength (MPa) of $231\pm31$; and a fracture toughness (MPa-m$^{\frac{1}{2}}$) of $9.1\pm0.1$.

EXAMPLE 6

A 99.64% pure titanium metal ingot (grade 2) measuring ⅝ inch in diameter and ¾ inch tall was embedded in particulate boron carbide (Atlantic Equipment Engineers, Bergenfield, N.J. $B_4C$ 99.7%, 1–5 micron) contained within an alumina crucible. The assembly, consisting of the alumina crucible and its contents, was placed in an induction furnace supplied with argon gas flowing at 300 cc/minute. The assembly was heated to the point where the titanium melted (about 1700°–1750° C. as measured by an optical pyrometer) over a 4 minute period, and then allowed to cool.

After the assembly was removed from the furnace, a powdered sample of the resulting ceramic composite was recovered and subjected to x-ray diffraction analysis. This analysis showed the presence of $TiB_2$, TiB, TiC and Ti.

FIG. 4 is a photomicrograph at 1500X magnification of a cross-section of the composite product showing $TiB_2$ as 28, TiB as 30, TiC as 32 and Ti as 34. The $TiB_2$ phase appeared in platelet-like structure.

EXAMPLE 7

A cylindrical sample of 99.64% pure titanium (grade 2) measuring ⅝ inch diameter by ¾ inch in length was embedded in boron carbide (1000 grit) contained in an alumina crucible. The assembly, consisting of the alumina crucible and its contents, was placed in a resistance heated vacuum furnace supplied with argon gas flowing at 500 cc/minute. The assembly was heated to a setpoint temperature of 1750° C. over a period of 3 hours, and then maintained at 1750° C. for 3 hours and 20 minutes.

After the assembly was removed from the furnace and cooled, a powdered sample of the resulting ceramic composite product was recovered and subjected to x-ray diffraction analysis. This analysis showed the presence of $TiB_2$, TiC and $Ti_3B_4$.

A sample of the product was subjected to a Knoop microhardness test as described in ASTM E384-73, using a 200 gf load, which indicated a microhardness of 1815–1950 kg/mm$^2$.

EXAMPLE 8

A 98.20% pure hafnium metal ingot measuring ⅜ inch in diameter and ⅜ inch tall was embedded in particulate boron carbide (−325 mesh) contained within an alumina crucible. The assembly, consisting of the alumina crucible and its contents, was placed in an induction furnace supplied with a gas consisting of 1% hydrogen and 99% argon, by volume, flowing at 500 cc/minute. The assembly was heated to 2300° C. (as measured by an optical pyrometer) over an 8 minute period, and then allowed to cool.

After the assembly was removed from the furnace, examination of the recovered sample showed that there was a very clean cylindrical void where the hafnium ingot had been. This indicates that the shape replication ability of this system is good. A powdered sample of the ceramic composite product obtained through this experiment was recovered and subjected to x-ray diffraction analysis. This analysis showed the presence of $HfB_2$, $HfC$, $Hf$ and minor amounts of $B_4C$.

FIG. 5 is a photomicrograph at 1500X magnification of a cross-section of the composite product showing $HfB_2$ as 36, $HfC$ as 38, $B_4C$ as 40 and $Hf$ as 42. The $HfB_2$ had a platelet structure.

As described above, other parent metals, different concentrations of starting materials and other variations such as density in packing, nature of the boron carbide particles, time and temperature may be used to alter or control the final product. Materials of this type would be useful for such applications as engine or rocket components.

EXAMPLE 9

A preform measuring 2 inches square and ⅛-inch thick was prepared by a similar technique to the technique described in Example I. However, the preform comprised about 95% by weight $B_4C$ (1000 grit from ESK) and about 5 percent by weight carbon black (991-UP from Cancarb Inc.) which functioned as both the carbon donor material and the binder. Specifically, the perform was formed by cold pressing the admixed starting materials in a steel die at about 1000 psi. A 2-inch square by ⅜-inch thick plate of zirconium parent metal (Grade 702 Zr from Teledyne Wah Chang Albany) was placed on top of, and in contact with, the cold pressed $B_4C$ preform. The entire setup was then placed in a graphite mold, as shown in FIG. 6. Specifically, the $B_4C$ preform 42 was contacted with a zirconium parent metal ingot 43, both of which were contained in a graphite (Grade ATJ from Union Carbide) refractory vessel 41 (the graphite vessel 41 may or may not include holes 45).

The assembly, consisting of the graphite mold and its contents, was placed in a resistance-heated vacuum furnace. The furnace was first evacuated at room temperature to a pressure of $1 \times 10^{-4}$ Torr and thereafter backfilled with argon. The furnace was then evacuated to a pressure of about $1 \times 10^{-2}$ Torr and thereafter heated to a temperature of about 250° C. over a period of about 30 minutes. The furnace was then heated from about 250° C. to about 450° C., at a rate of 100° C. per hour. The furnace chamber was backfilled with argon which remained flowing at a rate of about one liter per minute and was maintained at a pressure of about 2psi. The furnace was heated to a temperature of about 1900° C. over a five-hour period and then held at about 1900° C. for about two hours. The furnace was then cooled for about five hours.

After the assembly was removed from the furnace, quantitative image analysis was performed on the composite body. Particularly, the ratio of $ZrB_2/ZrC$ was experimentally determined to be about 1.03. This ratio can be compared with a standard ratio of $ZrB_2/ZrC$ which is about 1.39 i.e., the ratio of $ZrB_2/ZrC$ in a preform not having any carbon added thereto). Accordingly, it is clear that the $ZrB_2/ZrC$ ratio can be adjusted by adding a carbon donor material to a $B_4C$ preform prior to reactively infiltrating the perform.

EXAMPLE 10

A preform measuring 2 inches square and ⅛-inch thick was prepared by a similar technique to the technique described in Example I. The preform comprised about 95 percent by weight $B_4C$ (1000 grit from ESK) and about 5 percent by weight organic binder (Acrawax-C from Lonza, Inc.). The preform was formed by cold pressing the admixed starting materials in a steel die at 5000 psi. A 2-inch square by ⅜-inch thick plate of zirconium parent metal (Grade 702 Zr from Teledyne Wah Chang Albany) was placed on top of, and in contact with, the cold-pressed $B_4C$ preform. The entire setup was then placed in a graphite (Grade ATJ from Union Carbide) mold, as shown in FIG. 6. Moreover, a bottom portion 44 of the graphite mold 41 contained therein a plurality of through-holes 45. The approximate dimension of the bottom portion 44 was about 2-inch×2-inch. There were nine through-holes placed in the bottom portion 44 of the graphite mold 41, each of the through-holes having a diameter of about 1/16 inch.

The assembly, consisting of the graphite mold and its contents, was placed in a resistance-heated vacuum furnace. The furnace was first evacuated at room temperature to a pressure of $1 \times 10^{-4}$ Torr and thereafter backfilled with argon. The furnace was then evacuated to a pressure of about $1 \times 10^{-2}$ Torr and thereafter heated to a temperature of about 250° C. over a period of about 30 minutes. The furnace was thereafter heated from about 250° C. to about 450° C., at a rate of 100° C. per hour. The furnace was then backfilled with argon which then remained flowing at a rate of about two liters per minute and was maintained at a pressure of about 2 psi. The furnace was heated to a temperature of about 1900° C. over a 5-hour period and then held at about 1900° C. for about two hours. The furnace was then cooled for about five hours.

For comparison purposes, an identical setup was prepared, except that no through-holes were provided in a bottom portion of the graphite mold.

After each assembly was removed from the furnace, a comparison of the amount of porosity in each of the composite bodies was made. It was discovered that the amount of porosity contained in the composite body manufactured with a graphite mold having through-holes therein was less than the amount of porosity contained in a composite body manufactured with a graphite mold which did not have through-holes therein. Accordingly, it is readily apparent that use of through-holes in a graphite mold can reduce the amount of porosity in a composite body which is produced by reactive infiltration of a parent metal into a $B_4C$ preform.

EXAMPLE 11

A preform measuring 1 inch in diameter and ½ inch thick was prepared by admixing about 99 percent by weight $B_4C$ (1000 grit from ESK Co., Lot M10-C) and about 1 percent by weight of an organic binder (Dow Experimental Ceramic Binder XUS40303.0), then slip casting the slurry into a 1 inch diameter graphite crucible (ATJ grade graphite crucible from Graphite Die Mold Co.) which had been pre-soaked with methylene chloride. The slip was dried overnight in a drying box at room temperature to allow the methylene chloride to evaporate. The slip was then heated in an air furnace to 40° C. for approximately 4 hours to remove any traces of methylene chloride.

A mixture of metal sponge comprising about 75 percent by weight titanium metal (35.29 g Ti sponge known as Ti-Loy 99, Lot 11387, Chromalloy Co., ¼"+20 size pieces) and about 25 percent by weight zirconium metal (10.71 g Zr sponge from Western Zirconium, Lot 4840 Nuclear Grade, ¼"+20 size pieces), was jar milled for approximately one hour, and was placed, in powdered form, on top of the preform in the graphite crucible.

The assembly, consisting of the graphite crucible and its contents, was placed in a resistance heated vacuum furnace which was then evacuated to a pressure of about $1 \times 10^{-4}$ torr and backfilled with argon flowing at a rate of about 2 liters/minute. This step was repeated, and after the second evacuation and backfill step, the system was heated from room temperature to about 1750° C. in about four hours, held for about one hour at about 1750° C., heated from about 1750° C. to about 1900° C. in about one hour and held for about 2 hours at about 1900° C. The assembly was allowed to cool for about 3 hours prior to removal from the furnace.

Figure 8:
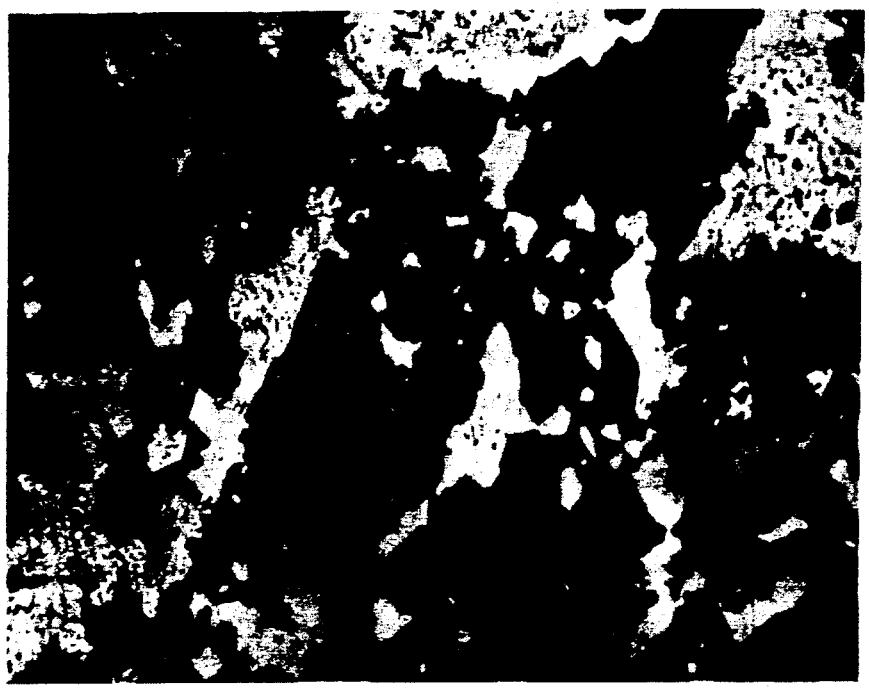
FIG. 8 is a photomicrograph at 1000X magnification of a section of a ceramic composite formed by the method described in Example 11.

Upon removal from the furnace, it was observed that the titanium/zirconium alloy had reactively infiltrated into the preform and formed a body comprising titanium diboride, titanium carbide, zirconium diboride, zirconium carbide and some residual titanium/zirconium alloy. FIG. 8 is a photomicrograph of the composite body formed.

EXAMPLE 12

A mixture comprising about 15 mole percent carbon and about 85 mole percent boron was prepared by mixing about 113 grams of $B_4C$ (1000 grit from ESK, Batch M10) and about 37 grams of boron (supplied by Atlantic Equipment Engineers having a crystalline structure, 98-99% 100 mesh powder). A preform was cast from the $B_4C$ and carbon mixture by dry pressing about 5.85 grams of the mixture at a pressure of about 5 Ksi. The resultant preform was cylindrical having a diameter of about 1 inch and a thickness of approximately ½ inch. The pressed preform was placed into a graphic crucible (ATJ grade graphite crucible from Graphite Die Mold Co.), and the graphite crucible containing the preform was placed into a retort furnace. The furnace was evacuated and backfilled with argon three times to ensure that a pure argon atmosphere was present in the furnace. The argon flow rate was approximately 2 liters/minute, which created a chamber pressure of about 1 psi. The furnace was heated from room temperature to about 250° C. in about 30 minutes, then heated from about 250° to about 300° C. in about one hour. The heat was increased to about 400° C. at a rate of approximately 10° C. per hour. The temperature was then increased from about 400° to about 500° C. in about two hours and maintained at about 500° C. for about one hour. The furnace was allowed to cool to room temperature.

A 702 grade zirconium metal cylinder, from Teledyne Wah Change Albany, weighing approximately 41.16 grams and measuring about 1 inch in diameter and about ½ inch in thickness was placed on top of the preform. The assembly, comprising the graphite crucible and its contents, was placed into a vacuum furnace. The furnace was evacuated and backfilled with argon flowing at a rate of approximately 2 liters per minute wherein the chamber pressure was about 1 psi. The furnace was heated from room temperature up to about 1900° C. in about five hours. This temperature was maintained for approximately two hours at which point the furnace was allowed to cool to room temperature.

Figure 9:
FIG. 9 is a photomicrograph at 1500X magnification of a section of a ceramic composite formed by the method described in Example 12.

Upon removal from the furnace, it was discovered that the zirconium had reactively infiltrated into the preform and formed a body comprising zirconium diboride, zirconium carbide and zirconium metal. FIG. 9 is a photomicrograph of the resultant composite.

What is claimed is:

1. A method for producing a self-supporting body, comprising:
   selecting a parent metal;
   heating said parent metal in a substantially inert atmosphere to a temperature above its melting point to form a body of molten parent metal;
   contacting said body of molten parent metal with a preform comprising boron carbide and at least one donor material selected from the group consisting of a boron donor material and a carbon donor material;
   maintaining said temperature for a time sufficient to permit infiltration of molten parent metal into said preform and to permit reaction of said molten parent metal with at least a portion of said preform; and
   continuing said infiltration and reaction for a time sufficient to produce said self-supporting body, said self-supporting body having a configuration corresponding to said preform.

2. The method according to claim 1, wherein said parent metal comprises at least one metal selected from the group consisting of titanium, zirconium, hafnium, vanadium, chromium, and niobium.

3. The method according to claim 1, wherein said parent metal comprises a sponge.

4. The method according to claim 1, wherein said preform is placed into a mold having means defining at least one vent.

5. A method for producing a self-supporting composite body, comprising:
   selecting a parent metal;
   heating said parent metal in a substantially inert atmosphere to a temperature above its melting point to form a body of molten parent metal;
   contacting said body of molten parent metal with a permeable mass comprising boron carbide, at least one inert filler, and at least one donor material selected from the group consisting of a boron donor material and a carbon donor material;
   maintaining said temperature for a time sufficient to permit infiltration of molten parent metal into said permeable mass and to permit reaction of said molten parent metal with said boron carbide to form at least one boron-containing compound and to permit reaction of said molten parent metal with said at least one donor material; and continuing said infiltration and reaction for a time sufficient to produce said self-supporting composite body comprising at least one parent metal boron-containing compound, said self-supporting composite body having said at least one inert filler embedded therein.

6. The method according to claim 5, wherein said parent metal comprises a metal selected from the group consisting of titanium, zirconium, hafnium, vanadium, chromium and niobium.

7. The method according to claim 5, wherein said parent metal comprises zirconium and a ratio of $ZrB_2/ZrC$ in said self-supporting composite body is about 1.

8. The method according to claim 5, wherein said parent metal comprises a titanium/zirconium alloy.

9. The method of claim 1, wherein said preform further comprises at least one inert filler material which becomes embedded within said self-supporting body.

* * * * *